(12) United States Patent
Jaramillo

(10) Patent No.: US 8,645,724 B2
(45) Date of Patent: Feb. 4, 2014

(54) REDRIVER CIRCUITS WITH POWER SAVING MODES

(75) Inventor: Kenneth Jaramillo, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 279 days.

(21) Appl. No.: 13/153,091

(22) Filed: Jun. 3, 2011

(65) Prior Publication Data
US 2012/0311359 A1   Dec. 6, 2012

(51) Int. Cl.
*H03K 19/003* (2006.01)
*H03K 19/173* (2006.01)

(52) U.S. Cl.
USPC ........... 713/300; 710/100; 710/301; 710/302; 710/303; 710/304; 326/21; 326/37; 326/38

(58) Field of Classification Search
USPC ............. 713/300; 710/100, 301–304; 326/21, 326/37–38
See application file for complete search history.

(56) References Cited

U.S. PATENT DOCUMENTS

| | | | |
|---|---|---|---|
| 6,732,218 B2 * | 5/2004 | Overtoom et al. | 710/313 |
| 6,744,810 B1 * | 6/2004 | Iyer et al. | 375/214 |
| 7,460,535 B2 * | 12/2008 | Govindaraman | 370/392 |
| 7,668,169 B2 * | 2/2010 | Govindaraman | 370/392 |
| 7,915,923 B1 * | 3/2011 | Yeung et al. | 326/82 |
| 7,986,159 B1 * | 7/2011 | Ahmad et al. | 326/21 |
| 2008/0219289 A1 | 9/2008 | Harrison et al. | |
| 2010/0105319 A1 | 4/2010 | Yeung et al. | |
| 2012/0235704 A1 * | 9/2012 | Yeung et al. | 326/30 |
| 2012/0317446 A1 * | 12/2012 | Jaramillo | 714/43 |

FOREIGN PATENT DOCUMENTS

WO   2008060598 A2   5/2008

OTHER PUBLICATIONS

"PI3EQX7701 5.0Gbps, 1-port, USB3.0 ReDriver with Digital Configuration", Pericom Semiconductor Corporation, 7 pgs., retrieved from the internet at: (Feb. 17, 2011) http://www.digchip.com/datasheets/parts/datasheet/362/PI3EQX7701-pdf.php (Jul. 29, 2009).

"Dual Channel USB3.0 Redriver/Equalizer", Texas Instruments, 27 pgs., retrieved from the internet at: (Feb. 17, 2011) http://www.datasheet.net/content/part-family/texas+instruments/SN65LVPE502?id=2850732 (Apr. 2010).

* cited by examiner

*Primary Examiner* — M Elamin

(57) ABSTRACT

Consistent with embodiments of the present disclosure a redriver circuit is provided for a first and a second serial-unidirectional communications channel. The redriver circuit conditions received data signals by adjusting signal properties to correct for signal level attenuation and noise. The conditioned data signals are transmitted to corresponding outputs of the channels. The redriver circuit disables, in response to a first enable signal being inactive, current drawing circuitry of components for both channels on a common side of the redriver. The redriver circuit disables, in response to a second enable signal being inactive, current drawing circuitry of components for both channels on the other side of the redriver.

18 Claims, 4 Drawing Sheets

REDRIVER CIRCUITS WITH POWER SAVING MODES

Serial communications/interconnect protocols provide efficient mechanisms to communicate between different devices. These protocols can include standards that define signal properties, timing and state changes required for compatibility with the protocol. Circuit designers need to take these requirements into consideration. Other considerations include reductions in power consumptions. The desire to increase data rates can lead to increasingly stringent signal properties and can also be at odds with the desire for lower power consumption.

One serial communications protocol is the Universal Serial Bus (USB) protocol. USB has been widely adopted in the electronics industry. USB 3.0 is the next generation of USB protocols and offers a 5 Gbps data rate. This protocol was adapted from PCI Express and offers improvements in speed as well as significant power savings. USB 3.0 can be used in many different devices including, but not limited to, laptops, desktops, external hard drives, printers, and cell phones.

With such advances in speed come more complex design challenges. Many times the integrated circuit (IC) chips that provide the communications functionality (e.g., USB Host Controllers, USB Hubs, USB Devices) are located quite far from the connectors. For instance, a single IC chip might provide multiple different ports, each port capable of communications with a different device. The ports might be linked to different connectors and/or to different devices on the same printed circuit board (PCB). These different components can be located at disparate locations, making placement of the single IC non-ideal for all components. Moreover, the single IC may function as a bridge to a different communications protocol, which has its own set of requirements. This can further limit the possible locations for the IC to be placed on the PCB. Accordingly, the distance from the IC to a connector or device might be far enough to result in degradation in the high speed (USB 3.0) signal to such an extent that some sort of redriver or retimer is necessary to restore the signal at the connector to an ideal level.

A redriver provides signal conditioning that can correct for signal degradation. More complex redrivers can also correct for other errors, e.g., a retiming redriver can correct for timing errors. Accordingly, the IC chip need not be designed for the worst case scenario and inclusion of redriver devices can allow computer chips to be designed for lower cost, lower power, and potentially somewhat non-(USB) compliance. The redriver is then expected to restore the incoming signal to valid signal levels.

Just as signal integrity is extremely important and complex given the high data rate, low power operation is also important given the fact that many mobile devices (laptops, cell phones, portable gaming systems, etc. . . . ) use protocols such as USB. Thus, many protocols have power saving modes in which portions of the transmitter and/or receiver circuits are placed into a lower power state, which can include disabling components of the circuit that draw significant amounts of power. As discussed herein, the power savings of a redriver circuit can also be an important design consideration.

Aspects of the present disclosure are directed to power savings in communications systems with power saving modes that address challenges including those discussed above, and that are applicable to a variety of protocols, devices, systems and methods. These and other aspects of the present disclosure are exemplified in a number of implementations and applications, some of which are shown in the figures and characterized in the claims section that follows.

Consistent with embodiments of the present disclosure a redriver circuit is provided for a first and a second serial-unidirectional communications channel. The redriver circuit conditions received data signals by adjusting signal properties to correct for signal level attenuation and noise. The conditioned data signals are transmitted to corresponding outputs of the channels. The redriver circuit disables, in response to a first enable signal being inactive, current drawing circuitry of components for both channels on a common side of the redriver. The redriver circuit disables, in response to a second enable signal being inactive, current drawing circuitry of components for both channels on the other side of the redriver.

Consistent with embodiments of the present disclosure a method comprises the use of a redriver circuit having a first and a second serial-unidirectional communications channel. The redriver circuit is used to receive a first data signal on a first input connection that corresponds to the first channel. The redriver circuit conditions the received first data signal by adjusting signal properties to correct for signal level attenuation and noise. The redriver circuit also transmits the conditioned first data signal to a first output connection of the redriver circuit, the first output connection corresponding to the first channel. A second data signal is received on a second input connection of the redriver circuit, the second input connection corresponding to the second channel. The redriver circuit conditions a received second data signal by adjusting signal properties to correct for signal level attenuation and noise. The conditioned second data signal is transmitted to a second output connection of the redriver circuit; the second output connection corresponding to the second channel. The redriver circuit disables, in response to a first enable signal being inactive, current drawing circuitry of the first input connection and the second output connection and also disables, in response to a second enable signal being inactive, current drawing circuitry of the second input connection and the first output connection.

According to other embodiments of the present disclosure, a redriver circuit comprises a first input connection corresponding to a first serial-unidirectional communications channel. The redriver circuit includes a first input circuit configured for receiving a first data signal from the first input connection. Conditioning circuitry is configured for conditioning the data signals by adjusting signal properties to correct for signal level attenuation and noise. A first output connection corresponds to the first serial-unidirectional communications channel. A first output circuit is configured for transmitting the first data signal, after conditioning by the conditioning circuitry, to the first output connection. The redriver circuit also includes a second input connection corresponding to a second serial-unidirectional communications channel and a second input circuit configured to receive a second data signal from the second input connection. A second output connection corresponds to a second serial-unidirectional communications channel. A second output circuit is configured to transmit the second data signal, after conditioning by the conditioning circuitry, to the second output connection. A first side enable connection receives a first enable signal. A second side enable connection receives a second enable signal. Control circuitry configured to disable, in response to the first enable signal being inactive, current drawing portions of the first input circuit and the second output circuit, and to disable, in response to the second enable signal being inactive, current drawing portions of the second input circuit and the first output circuit.

Aspects of the present disclosure are also directed towards a first serial-unidirectional communications interface that includes an input connection that corresponds to a first serial-unidirectional communications channel. An output connection corresponds to a second serial-unidirectional communications channel. A first side enable connection is configured to provide a first enable signal corresponding to a near side of a redriver. A second side enable connection is configured to provide a second enable signal corresponding to a far side of a redriver. Control circuitry is configured to determine power saving states for the communications interface and to set, in response to a particular power saving mode being active, the first enable signal to inactive and the second enable signal to active.

The above summary is not intended to describe each illustrated embodiment or every implementation of the present disclosure.

The above discussion is not intended to describe each embodiment or every implementation. Various example embodiments may be more completely understood in consideration of the following detailed description in connection with the accompanying drawings, in which.

Figure 1:
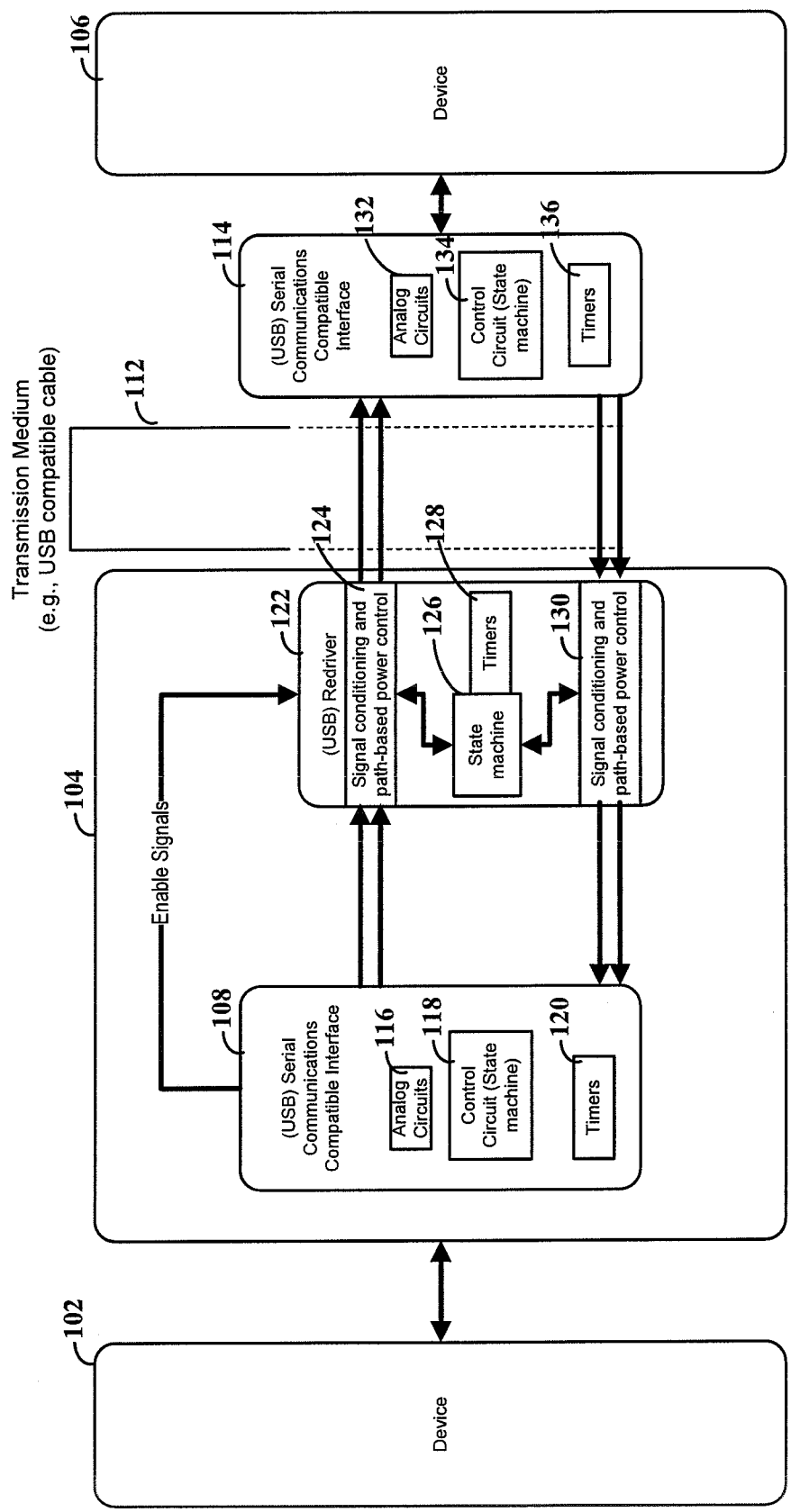
FIG. 1 depicts a block diagram of a system that includes a serial communications device and redriver circuit, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure. Furthermore, the term "example" as used throughout this document is by way of illustration, and not limitation.

Aspects of the present disclosure are directed to power savings in redriver circuits and related approaches, their uses and systems for the same. While the present disclosure is not necessarily limited to such applications, various aspects of the disclosure may be appreciated through a discussion of various examples using this context.

Aspects of the present disclosure are directed towards a redriver circuit configured for use with a serial communications protocol that has two unidirectional channels, where one channel is configured for transmitting data and the other channel is configured for receiving data. The redriver circuit is configured to receive enable signals are representative of the status of devices on either side of the redriver circuit (e.g., rather than based upon the status of either channel individually). The redriver circuit can then selectively disable power-drawing circuitry in response to the enable signals.

Embodiments of the present disclosure are directed toward a redriver circuit and/or a method of using a redriver circuit. The redriver circuit includes a first and a second serial-unidirectional communications channel. The redriver circuit receives a first data signal on a first input connection that corresponds to the first channel. The redriver circuit then conditions the received first data signal by adjusting signal properties to correct for aspects, such as adjusting the signal level attenuation and noise. The redriver circuit next transmits the conditioned first data signal to a first output connection of the redriver circuit, the first output connection corresponding to the first channel. A second data signal is received on a second input connection of the redriver circuit, the second input connection corresponding to the second channel. The redriver circuit also conditions the received second data signal by adjusting signal properties to correct for signal level attenuation and noise. The conditioned second data signal is transmitted to a second output connection of the redriver circuit, the second output connection corresponding to the second channel. In response to a first enable signal being inactive, the redriver circuit disables current drawing circuitry of the first input connection and the second output connection. In response to a second enable signal being inactive, the redriver circuit disables current drawing circuitry of the second input connection and the first output connection.

USB protocol 3.0 includes a number of low power states including the U2 and U3 lower power operation states. During the USB U2 and U3 low power states, the bus is expected to be idle for extended periods of time. Individual channel enables can reduce power, but certain power drawing circuits remain enabled during this state in order to maintain USB functionality. A single enable signal can also be used to reduce power during the U2 state; however, this also involves power drawing circuits remaining active.

Embodiments of the present disclosure are directed toward a USB 3.0 redriver that intelligently provides a side enable feature to reduce the power consumption during the U2 and U3 states. The redriver circuit has two interfaces each for communicating with a corresponding one of two different USB devices. One of the USB devices is considered the local device and is presumed to have knowledge of the redriver's/retimer's presence and to control enable/disable signals that are provided to the redriver circuit. For instance, a printed circuit board (PCB) may contain a first integrated circuit (IC) chip that includes a USB device. The first IC chip has one or more USB ports that connect to one or more redriver integrated circuit chips that are also located on the PCB. The redriver circuit responds to the control signals from the first IC chip by disabling the local USB Link (the link to the first IC chip) during U2 and U3 states (disabling the receiver detect functionality and receiver input signal detection functionality) while maintaining the external USB link (the link to another USB device) in the normal state (receiver detection functionality is enabled and input signal detection functionality is enabled).

Embodiments of the present disclosure are directed toward connections between two devices each featuring USB 3.0 connectivity and employing the use of the redriver. Each of the redrivers can include two independent USB side enables. For instance, one device could be a personal/laptop computer. Another product could be an external storage device, such as an external hard disk. Each product uses a redriver to improve signal integrity of the link. When both enables are deasserted to either of the redrivers, the redriver enters a "USB Link not operational" ultra low power operation to power down much of the redriver device.

During U2/U3 operation, each USB device can enter and be aware of the U2 and U3 power saving states. In addition, the USB device can instruct the redriver device to save even more power in the system. Since redriver circuits may not have the capability of decoding any data transmitted on the USB data lines, the redriver circuits may not be able to determine what side of the link they are on or what direction they are facing. Thus, redriver circuits may need to rely upon a local USB device to indicate when extra power savings are possible. This is possible because a USB device knows when it is entering (or wishes to leave) one of the U2/U3 states.

Thus, a USB device is able to determine when the redriver can effectively disable the power drawing circuits of the near end side.

In a connection with a local USB device (host or otherwise), the redriver can disable the far end termination detection to the local USB device as well as receiver input signal detection on the connection from the local USB device. Far end termination detection is not needed on the local side as it is always connected. Input detection is not needed on this side because the USB device will not generate any USB traffic until it leaves the current power state, at which time it can change the state of the enable signals. The redriver can then enable the far end termination detection to the local device.

Consistent with embodiments of the present disclosure, the redriver can include a USB state detection functionality and/or circuit. The USB state detection can be implemented using state machine logic to control the redriver circuitry. The state machine and control can be linked to one or more timers to handle various USB 3.0 related timings. The state machine determines when the various redriver components can be powered down. During the low power modes a number of components can be powered down including, but not limited to, a receiver equalizer circuit, a transmit buffer, receiver/transmitter termination circuits, receiver detection circuits, and the various other circuitry to control signal conditioning, output voltages, and/or de-emphasis.

Turning now to the figures, FIG. 1 depicts a block diagram of a system that includes a serial communications device and redriver circuit, consistent with embodiments of the present disclosure. A device 102 (e.g., a computer or similar host device) is designed to communicate with a remote device 106 (e.g., a storage device or similar peripheral device) using a first and a second serial-unidirectional communications channel. The serial communications compatible interfaces 108 and 114 allow devices 102 and 106 to use the first and second channels (e.g., functioning as a bridge between a local communication protocol of the corresponding device 102 or 106 and the two channels). The first channel allows communications from device 102 to be received at device 106, and the second channel allows communications from device 106 to be received at device 102.

The serial communications compatible interfaces 108 and 114 can include analog circuits 116 and 132 to drive and receive signals on the two channels as well as signals received from devices 102 or 106, which can each use different protocols. A state machine 118, 134 operates according to the proper protocols for the first and second channels. Timers 120, 136 provide synchronization, timeouts and/or other functionality relating to the state machines 118, 134 and the protocols for the first and second channels.

The system of FIG. 1 also includes a redriver 122 with circuitry for providing signal conditioning functions for signals on each of the two channels. The redriver 122 can be particularly useful for applications that are required to meet certain signal characteristics in order to allow the use of a transmission medium 112. Transmission medium 112 can be, for example, a conductive cable designed according to a certain specification (e.g., USB 3.0). Consistent with embodiments of the present disclosure, both redriver 122 and serial communication compatible interface 108 can be located on the same PCB 104. Optionally, device 102 can also be located on PCB 104.

The redriver 122 circuit can receive and process signals on either channel using signal conditioning circuits 124 and 130. These signal conditioning circuits are also configured to operate in power saving modes, which are responsive to a state machine 126 and timers 128. The state machine 126 responds to various inputs including, but not limited to, enable signals received from the serial communications compatible interface 108.

Interface 108 provides two different enable signals to redriver circuit 104. The serial communications compatible interface 108 is configured to provide the enable signals according to the status of respective sides of the redriver circuit, where a first side corresponds to a receiving portion of the first channel and a transmitting portion of the second channel, and where a second side corresponds to a receiving portion of the second channel and a transmitting portion of the first channel.

Consistent with embodiments of the present disclosure, the redriver circuit includes detection circuitry configured to detect the presence of an external receiving device. This detection circuitry information can be passed on to the transmitting device. For instance, the communication protocol may be required that a receiver provide termination (e.g., via terminating resistive elements). The redriver circuit therefore provides this termination on the input to each channel. The redriver circuit can also detect whether a receiver is connected by detecting the presence or absence of such termination on an output of each channel. Both the receiver termination and the circuitry for this monitoring can draw current when active. Accordingly, aspects of the present disclosure relate to disabling such circuitry in response to the enable signals.

For instance, when the enable signal for a side near the local device 108 is inactive (also referred to as the near side enable), receive circuitry for this local device 108 can be disabled. This is because the local device 108 will not transmit when the near side enable is absent (e.g., because device 108 is in a lower power mode). When the enable signal is reasserted, the redriver circuit places itself in a mode that allows for feed through communications to occur. Accordingly, aspects of the present disclosure are directed toward additional current savings from Input Detection and Rx Detection being disabled.

Aspects of the present disclosure are directed toward devices that can be used in connection with the USB protocol and with the USB 3.0 protocol. Although not necessarily limited thereto, much of the following discussion is presented in the context of the USB 3.0 protocol.

According to embodiments of the present disclosure, the redriver can detect the USB link state. For instance, a redriver chip may use a squelch indication and retimer may use actual USB link traffic to determine precisely what state the USB system is in. A design could also track less amounts of state, for example, only track three states (Rx Detect, U0, U2/U3). During U2/U3 states, the redriver can save power by disabling certain circuitry associated with enabling feed through mode. For instance, the redriver can disable transmitter termination and transmitter driver circuitry, while keeping receiver detection active as well as the local receiver termination active (to maintain USB Link connection).

When the USB system is in the U2/U3 state and the nearside enable is removed, the redriver can disable input detection for the nearside transmit channel and disable the Receiver detection circuit for the nearside receive channel. As discussed herein, the nearside transmit channel corresponds to the channel configured to transmit from the nearside device to a remote device, and the nearside receive channel corresponds to the other channel for receiving data at the nearside device. The nearside receiving channel maintains the receiver circuitry as active (including receiver termination) and also the receiver detection circuitry.

Figure 2:
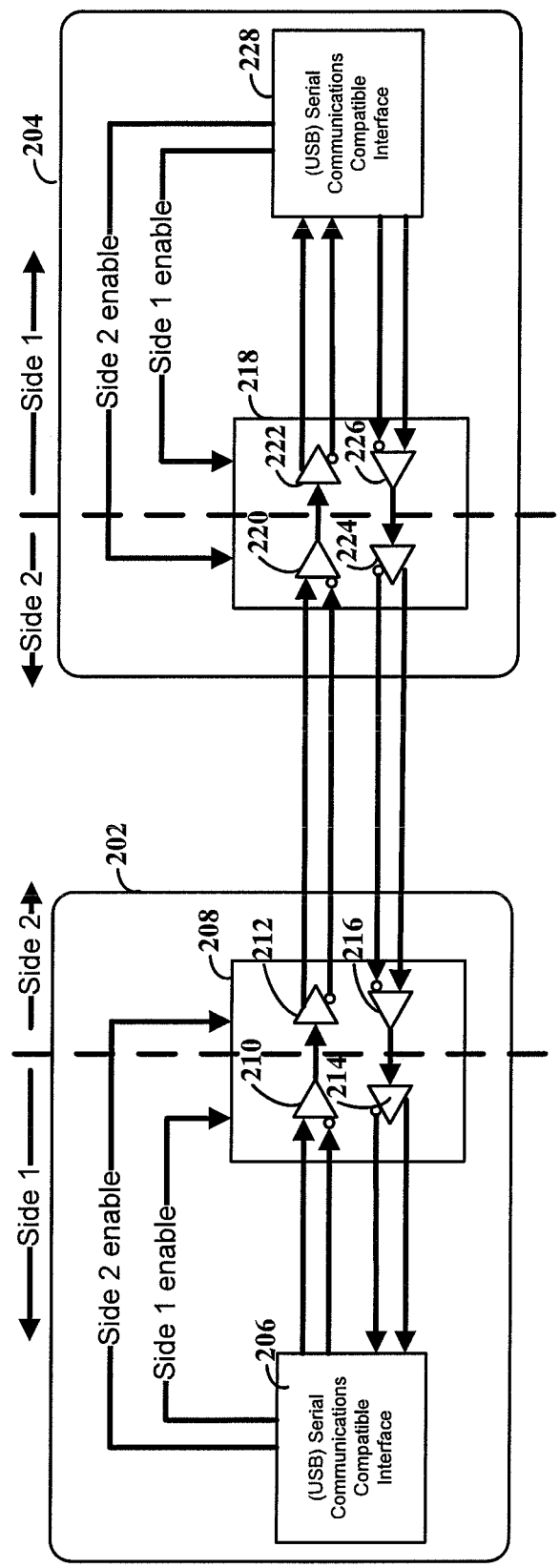
FIG. 2 depicts a system that includes two redriver circuits, consistent with embodiments of the present disclosure.

FIG. 2 depicts a system that includes two redriver circuits, consistent with embodiments of the present disclosure.

Devices 202 and 204 each include a (USB) Serial Communications Compatible Interface circuit 206, 228. There interface circuits are connected through respective redriver circuits 208, 218. Redriver circuits 208, 218 include input buffers 210, 216, 220 and 226. Each of these input buffers corresponds to a one of two unidirectional serial communications channels. Redriver circuits 208, 218 also include output buffers 212, 214, 222 and 224. These output buffers also correspond to a one of the two unidirectional serial communications channels.

Redriver circuits 208, 218 are configured to respond to two different enable signals. These signals can be used to control the power savings of the redriver circuits 208 and 218. For instance, these signals can indicate to the redriver which circuits can be powered down in the U2/U3 state. In one embodiment of the present disclosure, a redriver can to ignore the enable signals (unless both are deasserted) until the U2/U3 state is entered. The redriver then uses the enable signals to determine on which side of the redriver that certain circuits (input detection/rx detection) and may be disabled.

In each instance, side 1 is depicted as the near side and side 2 as the far side, relative to the local interface circuit 206 or 228. The redriver circuits 208, 218 can, however, be configured such that either side 1 or side 2 can function as the near side. This aspect allows a system designer flexibility in how to use the redriver chip (e.g., without having to be sure that side 1 is directly connected to the local interface circuit).

Consistent with embodiments of the present disclosure, the interface circuits 206, 228 and redrivers 208, 218 can both be USB 3.0 compatible. Devices 202 and 204 can be configured with one or more USB-compatible connectors (e.g., type A, type B or micro B). Accordingly, these connectors do not include a dedicated pin for the side 1 and side 2 enables. Thus, both enables can be controlled by the local interface circuit 206 or 228, although it is also possible that the far side (side 2) enables can hard-wired to be always enabled.

Figure 3:
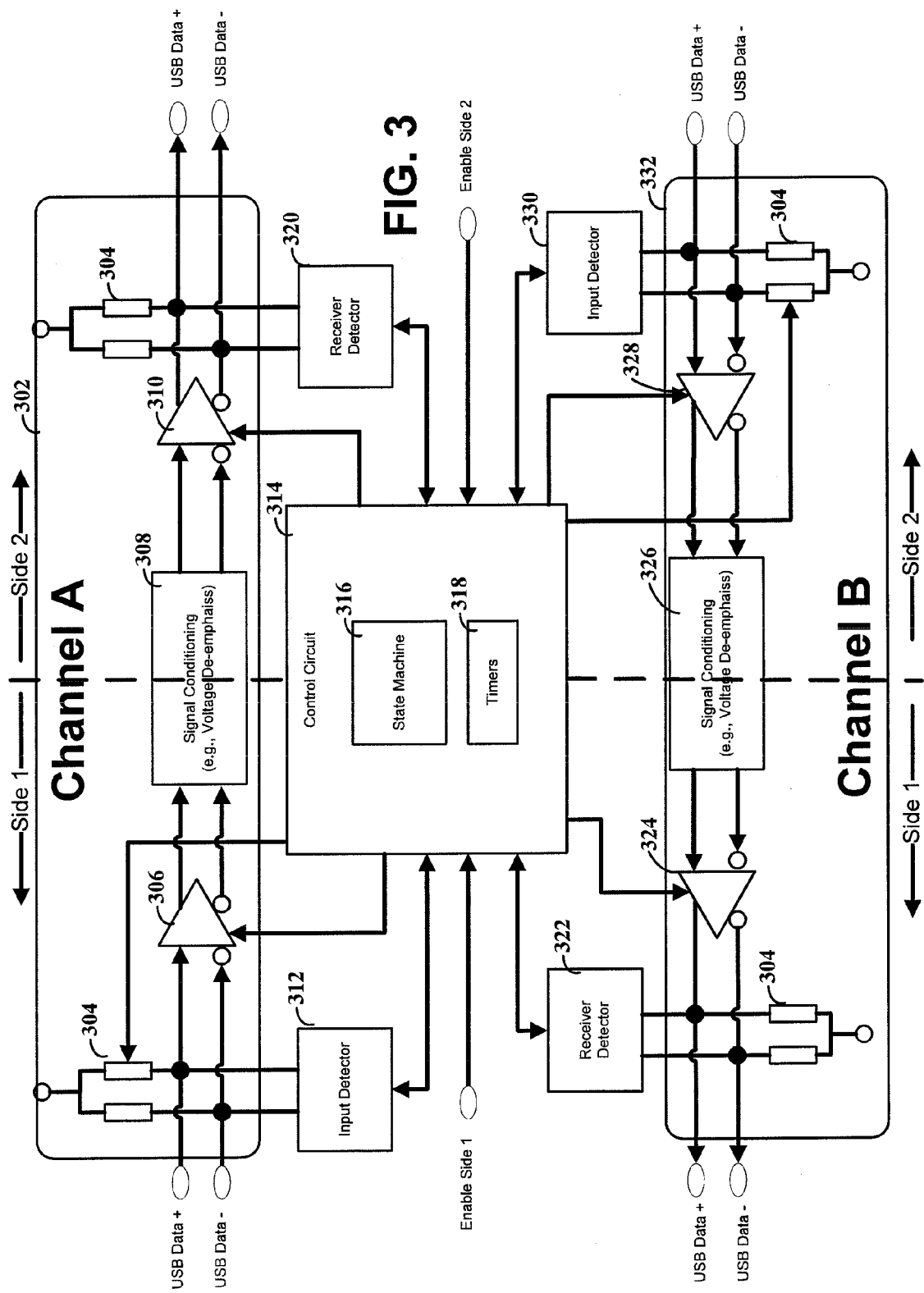
FIG. 3 depicts a block diagram for a redriver, consistent with embodiments of the present disclosure.

FIG. 3 depicts a block diagram for a redriver, consistent with embodiments of the present disclosure. The redriver is configured with a channel A (302) and a channel B (332). These channels represent unidirectional serial communications channels operating in opposite directions. Per the USB specification, the channels transmit data using differential signaling, represented by USB data+ and USB data−. These data lines are sometimes referred to as super speed receiver (or transmitter) differential pairs. Although not expressly depicted, the USB 3.0 protocol allows for legacy USB 2.0 differential data lines.

Signal conditioning circuits 308 and 326 maintain or return incoming signals to voltage levels, current driving capabilities, rise/fall timings and other signal properties to meet the USB 3.0 protocol. When the redriver detects that the U2/U3 power saving mode has been entered, the feed through function of the redriver is disabled. This can include disabling the signal conditioning circuitry and the associated power consumption.

The redriver is configured with a side 1 and side 2 for each of the channels A and B. In certain embodiments, these sides are functionally equivalent to the extent that either can be connected to a near-side device and/or to a remote device through a USB connector. In this manner, enable side 1 and enable side 2 inputs allow a near-side USB interface device to control the power saving modes of side 1 and side 2, respectively.

The channels each include termination components 304. On the transmit side of the channels, channel A-side 2 (A2) and channel b-side 1 (B1), the termination components 304 can be disabled. Disabling of these components is accomplished in a manner that substantially reduces and/or eliminates the current flow therefrom. For instance, a switch (e.g., a transistor) can disable current flow through the termination components 304.

The channels also include differential buffers/drivers 306, 310, 324 and 328. These drivers can each be disabled in response to the redriver detecting that the U2/U3 power saving mode has been entered, the feed through function of the redriver is disabled. Disabling of these components is accomplished in a manner that substantially reduces and/or eliminates the current flow to them. For instance, any current sources used by the buffers can be disabled.

Receiver detectors 320 and 322 detect when a device (external to the redriver) is connected to the corresponding USB channel. These detectors remain active unless their corresponding side enable is removed. If the corresponding side enable is removed, then the receiver detectors 322 and 320 will be disabled.

The redriver also includes input detectors 312 and 330. These detectors determine when an incoming data signal is received. This can be a relatively simple squelch detector (detecting valid signaling levels) or a more complicated data detection circuit. These input detectors remain active in U2/U3 state, but can be disabled when a respective side enable is removed.

Control circuit 314 includes logic, circuitry for receiving various inputs and providing disable/enable signals to the various components of the redriver. The control circuit 314 can operate according to a state machine 316. The state machine 316 can receive inputs from various components and from timers 318. Control circuit 314, including the functionality of state machine 316 can be implemented using a variety of different logic components, processors, associated configuration data and/or stored programming instructions.

Figure 4:
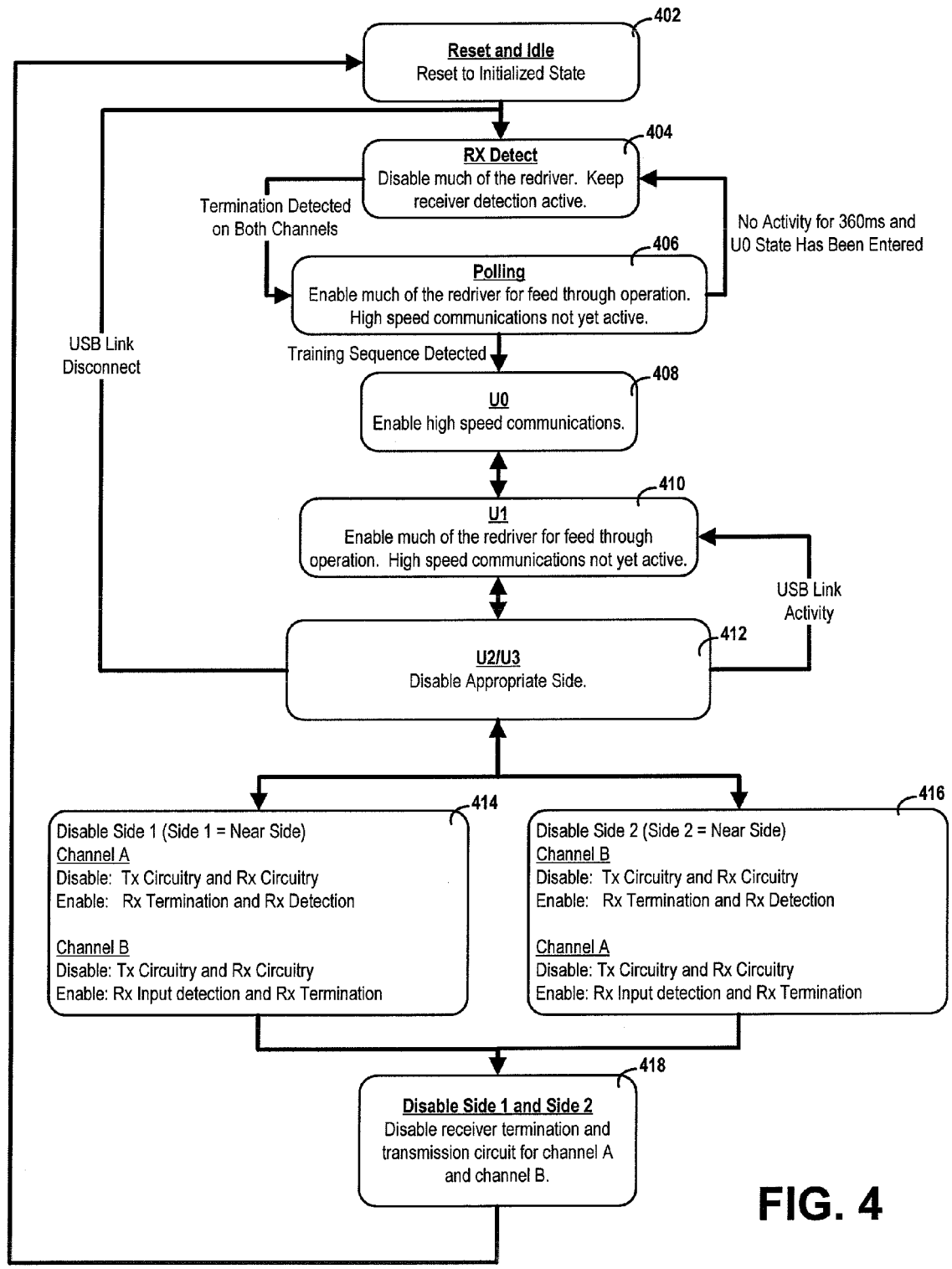
FIG. 4 depicts a flow diagram for various states of a USB system, consistent with embodiments of the present disclosure.

FIG. 4 depicts a flow diagram for various states of a USB system, consistent with embodiments of the present disclosure. The USB system begins in a reset and idle state 402. The various USB devices are initialized to a known state. After initialization, the RX detect state 404 is entered to wait for termination to be detected on both channels, which could happen, for example, where there is a hardwired local device providing termination on one end and then a new USB device is connected to a USB port. The RX detect state can also be entered if a USB link disconnect is detected from U2/U3 power saving modes. At this point, much of the redriver circuit is disabled since no feed through operation is required. Far end receiver detection, however, is still enabled.

When termination is detected on both channels, the polling state 406 is entered. During the polling stage, the devices are expected to communicate in order to configure themselves for communications. This can be accomplished using a training sequence. If no such activity is detected (e.g., through a squelch monitor) and a U0 state was previously entered, then the redriver can assume that an error has occurred and the USB system is returning to the RX Detect state 404. A local timer can be used to monitor for this eventuality. Up until this time, the redriver chip enables much or even all of its functionality to allow for feed through communications to occur. This mode, however, does not require that high-speed communications be active. Accordingly, redriver circuits that support only high speed communications can be disabled or otherwise controlled to reduce power consumption (e.g., signal conditioning requirements can be relaxed).

Once a training sequence has been detected, the USB system enters the U0 state 408. In this state, the redriver is configured to support high-speed communications in a feed through mode. From the U0 state, the USB system can enter the U1, U2 or U3 power saving states. In the U1 power savings state 410, the USB devices can begin transmitting on short notice. Accordingly, the redriver remains substantially (or entirely) enabled.

In the U2 and U3 power savings states 412, however, the USB devices are in a more restricted power saving modes. These power saving modes require a longer wakeup period before data transmission can resume. This wakeup can be triggered by the detection of USB link activity. Accordingly, the nearside USB device typically disables the near side. Depending upon the configuration, the near side could be side 1 (state 414) or side 2 (state 416). The redriver responds to the enable signal by disabling the transmitter and receiver circuitry of the respective sides. This includes receiver detection and input detection for the disabled side. The receiver detection and input detection for the enabled side, however, remains active.

With reference to FIGS. 3 and 4, the receiver (RX) circuitry for channel A can include, input detection 312, signal conditioning 308, miscellaneous/buffers 306, and receiver termination 304. Transmit (TX) circuitry for channel A can include transmit termination 304, miscellaneous/buffers 310, and receiver detection 320. Channel B would have corresponding components.

In certain situations both side 1 and side 2 can be disabled as depicted in state 418. This may occur where there is a soft reset of the USB system. In this instance, both sides of the receiver can be powered down. The USB system can then return to the reset and idle state 402.

The USB 3.0 specification includes a number of additional states not depicted in FIG. 4. The nearside USB interface device can be configured to assert or remove side enables as appropriate for these additional states, e.g., based upon whether or not feed through mode is required and whether or not input detection or receiver detection are required.

Unless specifically stated otherwise, it is appreciated that discussions utilizing terms such as "processing" or "computing" or "calculating" or "determining" or "displaying" or "monitoring" the like, refer to the action and processes of a logic circuit (such as a computer system, combinational and/or sequential electronic logic circuitry, a configurable or programmable circuit or a similar electronic computing device) that manipulates and transforms data represented as physical (electronic) quantities within the computer system's devices into other data similarly represented as physical quantities within the computer system devices such as memories, registers or other such information storage, transmission, display devices, or the like. As indicated in the examples provided above, such data is transformed for the purpose of changing the related representations of the physical aspects or quantities.

Unless otherwise indicated, various general purpose systems and/or logic circuitry may be used with programs in accordance with the teachings herein, or it may prove convenient to construct more specialized apparatus to perform the required method. For example, one or more of the methods according to the present disclosure can be implemented in hard-wired circuitry, by programming a general-purpose processor, other fully or semi-programmable logic circuitry, and/or by a combination of such hardware and a general-purpose processor configured with software.

One of skill in the art would appreciate that aspects of the disclosure can be practiced with computer system configurations other than those expressly described herein. The required structure for a variety of these systems and circuits would be apparent from the intended application and the above description.

It is to be understood that various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In an embodiment, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

Based upon the above discussion and illustrations, those skilled in the art will readily recognize that various modifications and changes may be made without strictly following the exemplary embodiments and applications illustrated and described herein. For instance, modifications from the current 3.0 USB specification could occur and result in changes to the corresponding state machine functionality. Such modifications do not depart from the true spirit and scope of the present disclosure, including that set forth in the following claims.

What is claimed is:

1. A method comprising:
using a redriver circuit having a first serial-unidirectional communications channel and a second serial-unidirectional communications channel, each channel having channel circuitry, including near-side current drawing circuitry and far-side current drawing circuitry, for passing data along a channel path, the redriver circuit used for:
receiving a first data signal on a first input connection that corresponds to the first channel;
conditioning the received first data signal by adjusting signal properties to correct for signal level attenuation and noise;
transmitting the conditioned first data signal to a first output connection corresponding to the first channel;
receiving a second data signal on a second input connection corresponding to the second channel;
conditioning the received second data signal by adjusting signal properties to correct for signal level attenuation and noise;

transmitting the conditioned second data signal to a second output connection corresponding to the second channel;

disabling, in response to a first enable signal being inactive, the near-side current drawing circuitry of the first channel and the far-side current drawing circuitry of the second channel; and disabling, in response to a second enable signal being inactive, the near-side current drawing circuitry of the second channel and the far-side current drawing circuitry of the first channel.

2. The method of claim 1, wherein the first and second serial communications channels are USB 3.0 channels, and wherein each of the first enable signal and the second enable signal transition into respective inactive states independently with one of the first enable signal and the second enable signal being inactive while the other of the first enable signal and the second enable signal being active.

3. The method of claim 1, wherein the current drawing circuitry in each channel includes at least one of a receiver equalizer, a transmit buffer, a termination component, an input detection component, a signal conditioning component, and a receiver detector, and wherein one of the first enable signal and the second enable signal being in an inactive state causes the current drawing circuitry in one of the channels to be disabled while the current drawing circuitry of the other one of the channels is not disabled.

4. The method of claim 1, further including using the redriver circuit for disabling a feed-through mode of the redriver circuit in response to determining that the first and the second serial-unidirectional communications channels are in a power savings state.

5. The method of claim 1, further including using the redriver circuit for actively monitoring, using monitor circuitry that is responsive to the first enable signal being inactive and the second enable signal being active, for data received on the second input connection.

6. The method of claim 1, further including using the redriver circuit for actively monitoring, using monitor circuitry that is responsive to the second enable signal being inactive and the first enable signal being active, for data received on the first input connection.

7. The method of claim 5, further including using the redriver circuit for disabling the monitor circuitry in response to both the first enable signal and the second enable signal being inactive.

8. A redriver circuit comprising:
a first input connection corresponding to a first serial-unidirectional communications channel;
a first input circuit configured for receiving a first data signal from the first input connection;
conditioning circuitry configured for conditioning the data signals by adjusting signal properties to correct for signal level attenuation and noise;
a first output connection corresponding to the first serial-unidirectional communications channel;
a first output circuit configured for transmitting the first data signal, after conditioning by the conditioning circuitry, to the first output connection;
a second input connection corresponding to a second serial-unidirectional communications channel;
a second input circuit configured to receive a second data signal from the second input connection;
a second output connection corresponding to the second serial-unidirectional communications channel;
a second output circuit configured to transmit the second data signal, after conditioning by the conditioning circuitry, to the second output connection;
a first side enable connection for receiving a first enable signal;
a second side enable connection for receiving a second enable signal; and
control circuitry configured to
disable, in response to the first enable signal being inactive, current drawing portions of the first input circuit and the second output circuit, and
disable, in response to the second enable signal being inactive, current drawing portions of the second input circuit and the first output circuit.

9. The redriver circuit of claim 8, wherein the first input connection and the second input connection are each configured and arranged to receive differential signal data.

10. The redriver circuit of claim 8, wherein the conditioning circuitry is further configured to provide signal de-emphasis, output voltage control and receiver equalization.

11. The redriver circuit of claim 8, wherein the first and second serial communications channels are USB 3.0 channels.

12. The redriver circuit of claim 8, wherein the control circuitry includes timers and is configured to function as a state machine that responds to the timer and to the first enable signal and the second enable signal.

13. The redriver circuit of claim 8, further including
first termination circuitry for providing signal termination on the first output connection;
second termination circuitry for providing signal termination on the second output connection;
a first switch for disabling current draw from the first termination circuitry in response to detecting a power savings mode of the first and second serial-unidirectional communications channel; and
a second switch for disabling current draw from the second termination circuitry in response to detecting the power savings mode of the first and second serial-unidirectional communications channel.

14. The redriver circuit of claim 8, further including monitor circuitry configured to monitor for received data on each of the first and second input connections, and to disable monitoring for a corresponding one of the first and second input connections in response to at least one of the enable signals being inactive.

15. A first serial-unidirectional communications interface comprising:
an input connection corresponding to a first serial-unidirectional communications channel;
an output connection corresponding to a second serial-unidirectional communications channel;
a first side enable connection for providing a first enable signal corresponding to a near side of a redriver;
a second side enable connection for providing a second enable signal corresponding to a far side of a redriver; and
control circuitry configured to
determine power saving states for the communications interface; and
set, in response to a particular power saving mode being active, the first enable signal to inactive and the second enable signal to active;
wherein each of the first enable signal and the second enable signal transition into respective inactive states independently with one of the first enable signal and the second enable signal being inactive while the other of the first enable signal and the second enable signal being active.

16. The interface of claim 15, wherein the first and second serial communications channels are USB 3.0 channels.

17. The interface of claim 16, wherein the particular power saving state corresponds to one of U2 and U3 power saving states.

18. The interface of claim 16, wherein the particular power saving state corresponds to one of U2 and U3 power saving states and wherein the control circuitry configured to set the first enable signal to active in response to the one of the U2 and U3 power saving states becoming inactive.

* * * * *